US012639240B2

(12) United States Patent
Heo et al.

(10) Patent No.: US 12,639,240 B2
(45) Date of Patent: May 26, 2026

(54) DMA DEVICE, OPERATING METHOD THEREOF, AND ELECTRONIC DEVICE INCLUDING DMA DEVICE

(71) Applicant: SAMSUNG ELECTRONICS CO., LTD., Suwon-si (KR)

(72) Inventors: Ingoo Heo, Suwon-si (KR);
Hyeonggyu Kim, Suwon-si (KR);
Jonghyun Park, Suwon-si (KR);
Jonghoon Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/940,052

(22) Filed: Nov. 7, 2024

(65) Prior Publication Data

US 2025/0238381 A1     Jul. 24, 2025

(30) Foreign Application Priority Data

Jan. 18, 2024    (KR) ........................ 10-2024-0008282

(51) Int. Cl.
G06F 13/16        (2006.01)
G06F 13/28        (2006.01)

(52) U.S. Cl.
CPC ...... G06F 13/1689 (2013.01); G06F 13/1673 (2013.01); G06F 13/28 (2013.01)

(58) Field of Classification Search
CPC .. G06F 13/1673; G06F 13/1689; G06F 13/28; G06F 3/00; G06F 9/00; G06F 12/00; G06F 16/00; G06F 15/00
See application file for complete search history.

(56) References Cited

U.S. PATENT DOCUMENTS

| | | | |
|---|---|---|---|
| 5,423,020 | A | 6/1995 | Vojnovich |
| 8,775,699 | B2 | 7/2014 | Nguyen et al. |

(Continued)

FOREIGN PATENT DOCUMENTS

| | | |
|---|---|---|
| CN | 117407337 A | 1/2024 |
| KR | 10-1593865 | 2/2016 |

OTHER PUBLICATIONS

Extended European Search Report dated May 19, 2025 issued in corresponding European Patent Application No. 24216675.9.

*Primary Examiner* — Yong J Choe

(74) *Attorney, Agent, or Firm* — Morgan, Lewis & Bockius LLP

(57)        ABSTRACT

A direct memory access (DMA) device includes a controller, a read request issuing circuit, a read buffer temporarily storing read data and an arrival time of the read data, and a read buffer managing circuit that calculates an average bus latency and an average buffer residence time. The read request issuing circuit adjusts the issuing capability based on the average bus latency and the average buffer residence time. The DMA device operates by issuing a read request based on an issuing capability, storing an issuing time of the read request, receiving read data corresponding to the read request, temporarily storing the read data and an arrival time of the read data in a read buffer, calculating an average bus latency based on the issuing time of the read request, calculating an average buffer residence time, adjusting the issuing capability, and issuing the read request based on the adjusted issuing capability.

20 Claims, 10 Drawing Sheets

(56)  References Cited

U.S. PATENT DOCUMENTS

|  |  |  |  |
|---|---|---|---|
| 9,251,108 B2 | 2/2016 | Bass et al. | |
| 9,727,504 B2 | 8/2017 | Yamamoto | |
| 10,387,340 B1 * | 8/2019 | Baryudin | G06F 3/0616 |
| 11,016,912 B2 * | 5/2021 | Park | G06F 13/28 |
| 11,704,054 B1 | 7/2023 | Li | |
| 2005/0253858 A1 | 11/2005 | Ohkami et al. | |
| 2014/0129749 A1 | 5/2014 | Bass et al. | |
| 2016/0371015 A1 * | 12/2016 | Gay | G06F 13/1689 |
| 2019/0278485 A1 | 9/2019 | Benisty | |
| 2022/0083486 A1 * | 3/2022 | George | G06F 13/28 |

* cited by examiner

FIG. 5

DMA DEVICE, OPERATING METHOD THEREOF, AND ELECTRONIC DEVICE INCLUDING DMA DEVICE

CROSS-REFERENCE TO RELATED APPLICATIONS

This application claims priority under 35 U.S.C. § 119 to Korean Patent Application No. 10-2024-0008282, filed on Jan. 18, 2024 in the Korean Intellectual Property Office, the disclosure of which is incorporated by reference herein in its entirety.

TECHNICAL FIELD

Embodiments of the inventive concept relate to a direct memory access (DMA) device that reads data utilized to operate an accelerator from a memory device.

DISCUSSION OF RELATED ART

Direct memory access (DMA) refers to accessing memory devices from peripheral devices included in an electronic device without passing through a central processing unit (CPU). That is, DMA devices may access memory devices without passing through a CPU according to DMA. For example, a DMA device may read data utilized for operation of a device, for example, an accelerator that performs operations, such as security processing, image processing, and digital signal processing, from a memory device, and provide the data to the device.

SUMMARY

Embodiments of the inventive concept provide a direct memory access (DMA) device with improved performance.

According to an embodiment of the inventive concept, a DMA device, which reads data utilized for an operation of an accelerator from a memory device, includes a controller configured to control an operation of the DMA device, a read request issuing circuit configured to issue a read request based on an issuing capability and store an issuing time of the read request, a read buffer configured to temporarily store read data corresponding to the read request and store an arrival time of the read data, and a read buffer managing circuit configured to count a current time, calculate an average bus latency based on the issuing time of the read request when receiving the read data from the memory device, and calculate an average buffer residence time based on the arrival time of the read data when the read data stored in the read buffer is output to the accelerator. The read request issuing circuit is configured to adjust the issuing capability based on the average bus latency and the average buffer residence time and issue the read request based on the adjusted issuing capability.

According to an embodiment of the inventive concept, an operating method of a DMA device that reads data utilized for an operation of an accelerator from a memory device includes issuing, by a read request issuing circuit, a read request based on issuing capability, storing an issuing time of the read request in the read request issuing circuit, receiving, by a read buffer, read data corresponding to the read request, temporarily storing the read data corresponding to the read request in a read buffer, and storing an arrival time of the read data in the read buffer. The method further includes calculating, by a read buffer managing circuit, an average bus latency based on the issuing time of the read request, calculating, by the read buffer managing circuit, an average buffer residence time based on the arrival time of the read data when the read data stored in the read buffer is output to the accelerator, adjusting, by the read request issuing circuit, the issuing capability based on the average bus latency and the average buffer residence time, and issuing, by the read request issuing circuit, the read request based on the adjusted issuing capability.

According to an embodiment of the inventive concept, an electronic device includes a memory device configured to store data, an accelerator configured to operate based on data stored in the memory device, and a DMA device configured to read data utilized for an operation of the accelerator from the memory device. The DMA device includes a controller configured to control an operation of the DMA device, a read request issuing circuit configured to issue a read request based on an issuing capability and store an issuing time of the read request, a read buffer configured to temporarily store read data corresponding to the read request and store an arrival time of the read data, and a read buffer managing circuit configured to count a current time, calculate an average bus latency based on the issuing time of the read request when receiving the read data from the memory device, and calculate an average buffer residence time based on the arrival time of the read data when the read data stored in the read buffer is output to the accelerator. The read request issuing circuit is configured to adjust the issuing capability based on the average bus latency and the average buffer residence time and issue the read request based on the adjusted issuing capability.

BRIEF DESCRIPTION OF THE DRAWINGS

The above and other features of the inventive concept will become more apparent by describing in detail embodiments thereof with reference to the accompanying drawings, in which:

FIG. 5 is a diagram illustrating an operation of calculating an average bus latency by a DMA device, according to an embodiment;

DETAILED DESCRIPTION OF THE EMBODIMENTS

Figure 1:
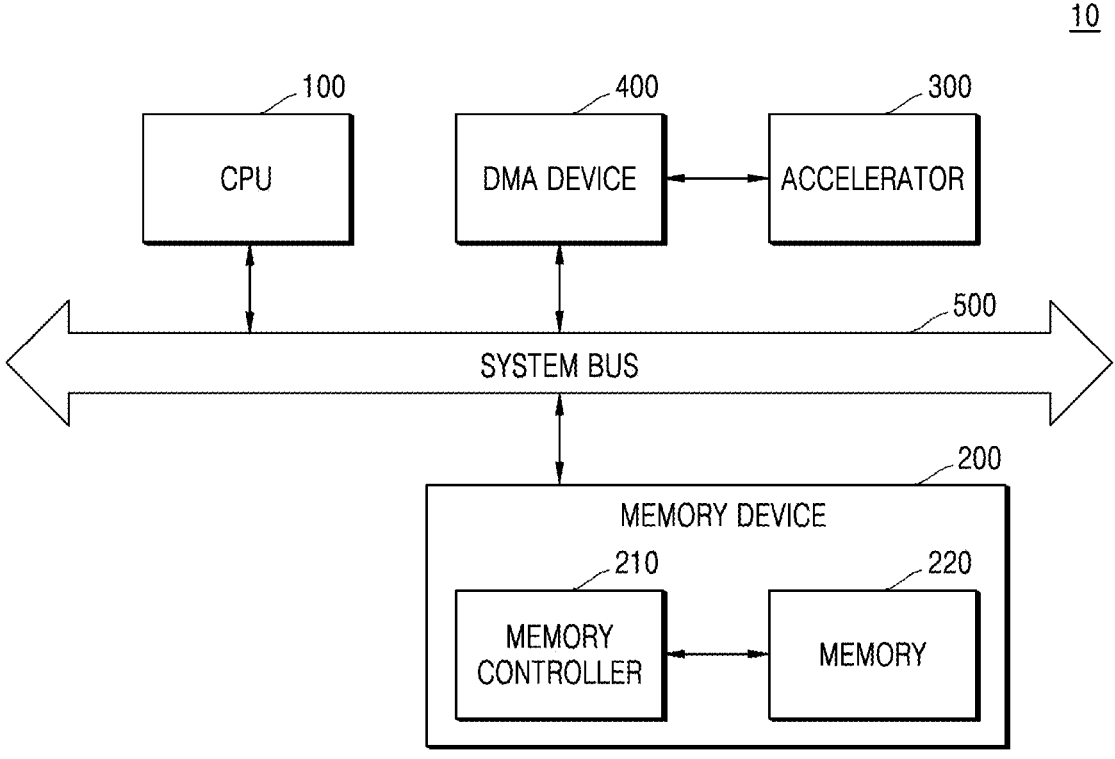
FIG. 1 is a block diagram illustrating an electronic device, according to an embodiment.

Embodiments of the inventive concept will be described more fully hereinafter with reference to the accompanying drawings. Like reference numerals may refer to like elements throughout the accompanying drawings.

Embodiments of the inventive concept may improve the performance of direct memory access (DMA) devices that provide data necessary for proper operation to peripheral devices.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is a block diagram illustrating an electronic device according to an embodiment.

Referring to FIG. 1, an electronic device 10 according to an embodiment may include a central processing unit (CPU) 100, a memory device 200, an accelerator 300 (also referred to as an accelerator circuit), a direct memory access (DMA) device 400, and a system bus 500.

In an embodiment, the electronic device 10 may include any one of a smartphone, a tablet personal computer (PC), a smart television (TV), a mobile phone, a personal digital assistant (PDA), a laptop computer, a media player, a micro server, a global positioning system (GPS) device, an electronic book terminal, a digital broadcasting terminal, a navigation device, a kiosk, a motion picture experts group (MPEG) layer-3 (MP3) player, a digital camera, a home appliance, and a mobile or non-mobile computing device, but is not limited thereto. In addition, the electronic device 10 may include a wearable device having a data processing function, such as, for example, a watch, glasses, hairband, or a ring, but is not limited thereto. According to embodiments, the electronic device 10 may include all types of devices that operate based on an operating system (OS) by using a processor.

The CPU 100 may control all operations of the electronic device 10. That is, the CPU 100 may control operations of all devices included in the electronic device 10. In embodiments of the inventive concept, the CPU 100 may include an application processor (AP).

The memory device 200 may store data used for the electronic device 10. The memory device 200 may include a memory controller 210 and a memory 220.

The memory controller 210 may control an operation of the memory 220. The memory controller 210 may cause the memory 220 to read data stored in the memory 220 in response to a read request received through the system bus 500. The memory controller 210 may control the memory 220 such that data is programmed into the memory 220 in response to a program request received through the system bus 500. The memory controller 210 may control the memory 220 such that the data stored in the memory 220 is deleted in response to an erasure request received through the system bus 500.

The memory 220 may store data. In an embodiment, the memory 220 may include dynamic random access memory (DRAM). However, embodiments of the inventive concept are not limited thereto. For example, in an embodiment, the memory 220 may include another type of volatile memory device, such as static random access memory (SRAM), or may include a non-volatile memory device, such as flash memory.

The accelerator 300 (also referred to as an accelerator circuit) may operate based on the data stored in the memory device 200. The accelerator 300 may perform various types of operations based on the data stored in the memory device 200. For example, the accelerator 300 may perform various types of operations related to security processing, image processing, digital signal processing, etc. The accelerator 300 may read the data stored in the memory device 200 through the DMA device 400.

The DMA device 400 may read the data utilized to operate the accelerator 300 from the memory device 200. The DMA device 400 may transmit a read request to the memory device 200 through the system bus 500. In this case, the read request transmitted by the DMA device 400 may be a multiple outstanding request for requesting to read a plurality of pieces of data at a time.

In an embodiment, the DMA device 400 may calculate an average bus latency and an average buffer residence time, adjust issuing capability based on the average bus latency and average buffer residence time, and issue a read request based on the adjusted issuing capability. In this case, the average bus latency may indicate the time taken from the time when a read request is transmitted through the system bus 500 to the time when read data is received. The average buffer residence time may indicate the time taken from the time when read data is received to the time when the received read data is output to the accelerator 300. Issuing capability may indicate the number of pieces of data read from the memory device 200 through one read request. A more detailed structure and operation of the DMA device 400 is described below with reference to FIG. 2.

The system bus 500 may be used as a data transmission path between the CPU 100, the memory device 200, the accelerator 300, and the DMA device 400.

Figure 2:
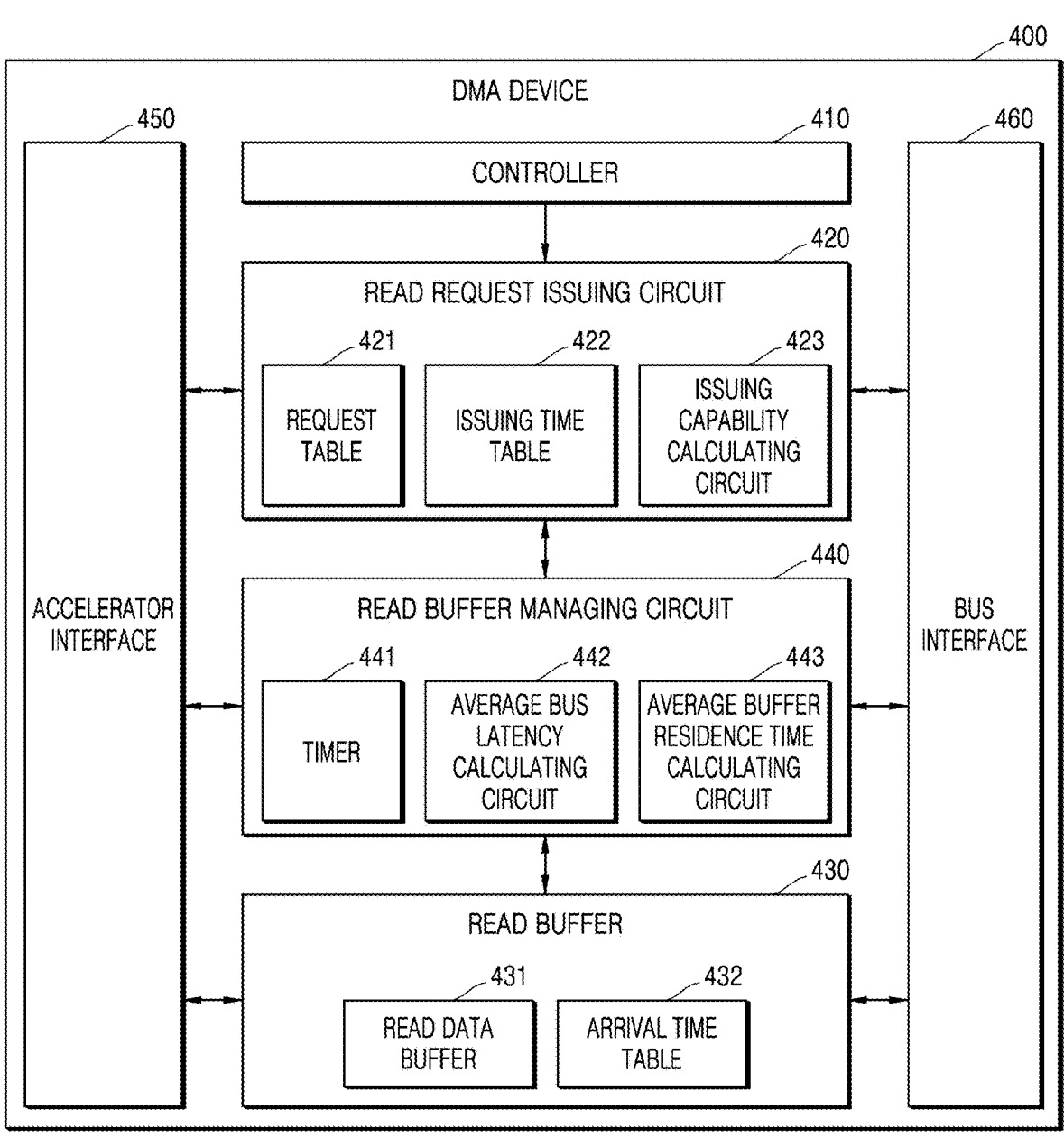
FIG. 2 is a block diagram illustrating a direct memory access (DMA) device, according to an embodiment.

FIG. 2 is a block diagram illustrating a DMA device according to an embodiment.

Referring to FIG. 2, the DMA device 400 according to an embodiment may include a controller 410 (also referred to as a controller circuit), a read request issuing circuit 420, a read buffer 430 (also referred to as a read buffer circuit), and a read buffer managing circuit 440. Also, the DMA device 400 may further include an accelerator interface 450 and a bus interface 460.

The controller 410 may control all operations of the DMA device 400. In an embodiment, the controller 410 may set an initial value of issuing capability based on the size of the read buffer 430. For example, the controller 410 may set the initial value of the issuing capability to read the same number of pieces of data as the size of the read buffer 430 through a read request.

The read request issuing circuit 420 may issue a read request based on issuing capability and store the issuing time of the read request. Also, the read request issuing circuit 420 may adjust issuing capability based on an average bus latency and an average buffer residence time. The read request issuing circuit 420 may include a request table 421, an issuing time table 422, and an issuing capability calculating circuit 423.

The request table 421 may store the read request issued by the read request issuing circuit 420. The request table 421 may store information on the issued read request such as, for example, an index of the read request.

The issuing time table 422 may store an issuing time corresponding to the read request stored in the request table

421. When a read request is issued, the issuing time table 422 may receive the current time from a timer 441 included in the read buffer managing circuit 440. Next, the issuing time table 422 may store the current time received from the timer 441 as an issuing time of the read request. Due to this, the issuing time table 422 may store the time at which the read request is issued as an issuing time of the read request.

When receiving an arrival notice of read data, the issuing time table 422 may output a generation time of the read request corresponding to the received read data to the read buffer managing circuit 440. The issuing time of the read request output to the read buffer managing circuit 440 may be used for calculating an average bus latency, as described below.

The issuing capability calculating circuit 423 may adjust issuing capability based on an average bus latency and an average buffer residence time.

In an embodiment, the issuing capability calculating circuit 423 may adjust issuing capability based on the average bus latency calculated by an average bus latency calculating circuit 442 of the read buffer managing circuit 440, as described below. In this case, the issuing capability calculating circuit 423 may adjust issuing capability in proportion to an average bus latency. For example, when the average bus latency increases, the issuing capability calculating circuit 423 may increase the issuing capability to read the data utilized by the accelerator 300 for proper operation of the accelerator 300 in advance from the memory device 200. In contrast to this, when the average bus latency decreases, the data utilized by the accelerator 300 for proper operation of the accelerator 300 does not need to be read in advance from the memory device 200, and accordingly, the issuing capability calculating circuit 423 may reduce issuing capability.

In an embodiment, the issuing capability calculating circuit 423 may adjust issuing capability based on the average buffer residence time calculated by an average buffer residence time calculating circuit 443 of the read buffer managing circuit 440 as described below. In this case, the average buffer residence time calculating circuit 443 may adjust issuing capability in inverse proportion to the average buffer residence time. For example, when the average buffer residence time increases, data processing of the accelerator 300 is delayed, and accordingly, the issuing capability calculating circuit 423 may reduce issuing capability. In contrast to this, when the average buffer residence time decreases, data processing of the accelerator 300 is performed more quickly, and accordingly, issuing capability may be increased.

The issuing capability calculating circuit 423 may adjust issuing capability based on the average bus latency and average buffer residence time at each preset adjustment time interval. The adjustment time interval may indicate a time interval at which the issuing capability is adjusted. The adjustment time interval may be experimentally set to a time interval at which there may be a significant change in the average bus latency and average buffer residence time because a number of read requests may be issued.

The read request issuing circuit 420 may issue a read request based on the adjusted issuing capability. When the adjusted issuing capability is greater than the existing issuing capability, the read request issuing circuit 420 may increase the number of pieces of data read from the memory device 200 through a read request. In contrast to this, when the adjusted issuing capability is reduced compared to the existing issuing capability, the read request issuing circuit

420 may reduce the number of pieces of data read from the memory device 200 through a read request.

The read buffer 430 may temporarily store the read data corresponding to a read request and store an arrival time of the read data. The read buffer 430 may include a read data buffer 431 and an arrival time table 432.

The read data buffer 431 may temporarily store the read data. The read data buffer 431 may temporarily store the read data received according to the read request issued by the read request issuing circuit 420.

The arrival time table 432 may store an arrival time corresponding to the read data stored in the read data buffer 431. When receiving the read data, the arrival time table 432 may receive the current time from the timer 441 included in the read buffer managing circuit 440. Next, the arrival time table 432 may store the current time received from the timer 441 as an arrival time of the read data. Due to this, the arrival time table 432 may store the time at which the read data is received as the arrival time of the read data.

In this case, the arrival time may correspond to a plurality of pieces of read data received according to the same read request. A read request transmitted by the DMA device 400 may request the reading of a plurality of pieces of data at a time, and accordingly, a plurality of pieces of read data received according to the same read request may be received simultaneously. Therefore, the plurality of pieces of read data received according to the same read request may have the same arrival time.

When read data is output to the accelerator 300, the arrival time table 432 may output the arrival time of the read data corresponding to the output read data to the read buffer managing circuit 440. The arrival time of read data output to the read buffer managing circuit 440 may be used to calculate an average buffer residence time as described below.

When receiving the read data from the memory device 200, the read buffer 430 may transmit an arrival notice of the read data to the read request issuing circuit 420. The arrival notice of the read data may be a notice indicating that the read data corresponding to the read request is received from the memory device 200 through the system bus 500. When the read buffer 430 transmits the arrival notice of the read data, the issuing time table 422 may output a generation time of the read request corresponding to the read data to the read buffer managing circuit 440, and the read buffer managing circuit 440 may calculate an average bus latency.

The read buffer managing circuit 440 may count the current time and calculate an average bus latency and an average buffer residence time. The read buffer managing circuit 440 may include the timer 441 (also referred to as a timer circuit), the average bus latency calculating circuit 442, and the average buffer residence time calculating circuit 443.

The timer 441 may count the current time. The timer 441 may output the current time to the issuing time table 422, the arrival time table 432, the average bus latency calculating circuit 442, and the average buffer residence time calculating circuit 443. As the timer 441 outputs the current time to the issuing time table 422, the issuing time table 422 may store the current time as the issuing time of a read request. As the timer 441 outputs the current time to the arrival time table 432, the arrival time table 432 may store the current time as the arrival time of the read data. As the timer 441 outputs the current time to the average bus latency calculating circuit 442 and the average buffer residence time calculating circuit 443, the average bus latency calculating circuit 442 and the average buffer residence time calculating circuit 443 may respectively calculate an average bus latency and an average buffer residence time as described below.

When receiving the read data from the memory device 200, the average bus latency calculating circuit 442 may calculate an average bus latency based on the issuing time of the read request. The average bus latency may indicate the time taken from the time when a read request is transmitted through the system bus 500 to the time when the read data is received. The average buffer residence time may change depending on a state of the system bus 500. For example, when the state of the system bus 500 is a busy state, the average bus latency may increase. In contrast to this, when the state of the system bus 500 is not the busy state, the average bus latency may be reduced.

When the read data is received from the memory device 200, the average bus latency calculating circuit 442 may receive an issuing time of the read request from the issuing time table 422. Also, the average bus latency calculating circuit 442 may receive the current time from the timer 441 after receiving the issuing time of the read request.

The average bus latency calculating circuit 442 may calculate the average bus latency based on a difference between the issuing time of the read request and the current time. The average bus latency calculating circuit 442 may calculate the difference between the issuing time of the read request and the current time as a bus latency. Next, the average bus latency calculating circuit 442 may calculate an average bus latency by obtaining a movement average between the calculated bus latency and the previously calculated average bus latency.

When the read data stored in the read buffer 430 is output to the accelerator 300, the average buffer residence time calculating circuit 443 may calculate an average buffer residence time based on the arrival time of the read data. The average buffer residence time may indicate the time taken from the time when the read data is received to the time when the received read data is output to the accelerator 300. The average buffer residence time may change depending on the throughput of the accelerator 300. For example, when the throughput of the accelerator 300 is high, the average buffer residence time may decrease. In contrast to this, when the throughput of the accelerator 300 is low, the average buffer residence time may increase.

When the read data is received from the memory device 200, the average buffer residence time calculating circuit 443 may receive the arrival time of the read data from the arrival time table 432. Also, the average buffer residence time calculating circuit 443 may receive the current time from the timer 441 after receiving the arrival time of the read data.

The average buffer residence time calculating circuit 443 may calculate an average buffer residence time based on a difference between the arrival time of the read data and the current time. The average buffer residence time calculating circuit 443 may calculate the difference between the arrival time of the read data and the current time as the buffer residence time. Next, the average buffer residence time calculating circuit 443 may calculate the average buffer residence time by obtaining a movement average between the calculated buffer residence time and the previously calculated average buffer residence time.

The accelerator interface 450 may connect the DMA device 400 to the accelerator 300. The accelerator interface 450 may manage requests and data transmission between the accelerator 300 and the DMA device 400.

The bus interface 460 may connect the DMA device 400 to the system bus 500. The bus interface 460 may manage requests and data transmission between the DMA device 400 and the system bus 500.

As described above, the DMA device 400 according to embodiments of the inventive concept may calculate an average bus latency and an average buffer residence time, adjust issuing capability based on the average bus latency and the average buffer residence time, and issue a read request based on the adjusted issuing capability. As a result, the DMA device 400 may provide improved performance depending on the throughput of the accelerator 300 and a state of the system bus 500.

Figure 3:
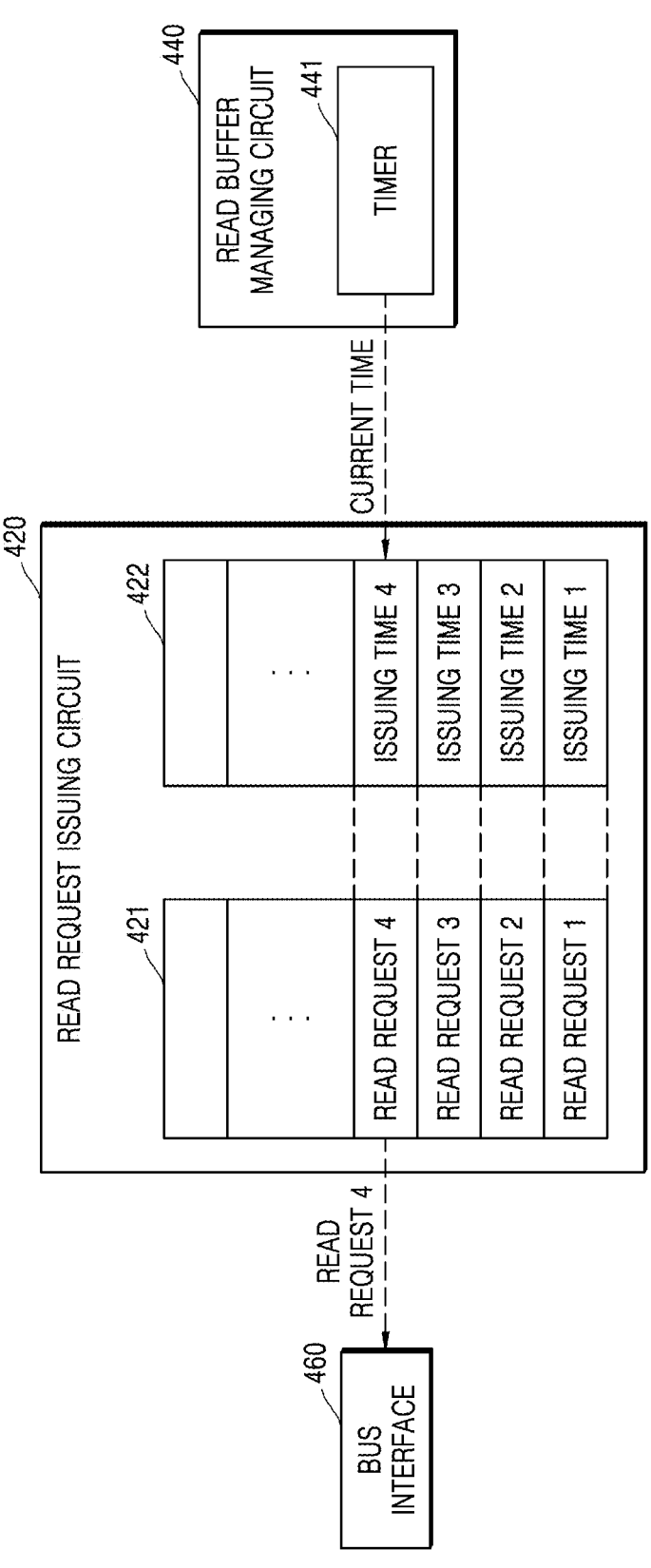
FIG. 3 is a diagram illustrating an operation according to a read request of a DMA device, according to an embodiment.

FIG. 3 is a diagram illustrating an operation according to a read request of a DMA device according to an embodiment.

FIG. 3 illustrates the read request issuing circuit 420, the read buffer managing circuit 440, and the bus interface 460 included in the DMA device 400, according to an embodiment.

The read request issuing circuit 420 may include the request table 421 and the issuing time table 422. The request table 421 may store issued read requests and may store first to fourth read requests in an embodiment according to FIG. 3. The issuing time table 422 may store issuing times corresponding to the read requests stored in the request table 421 and may store first to fourth issuing times in an embodiment according to FIG. 3. In this case, the first to fourth issuing times may respectively correspond to the first to fourth read requests.

In an embodiment according to FIG. 3, as the read request issuing circuit 420 issues the fourth read request to the bus interface 460, the request table 421 may store the fourth read request. Also, as the read request issuing circuit 420 issues the fourth read request, the issuing time table 422 may receive the current time from the read buffer managing circuit 440 and convert the received current time into the fourth issuing time.

Figure 4:
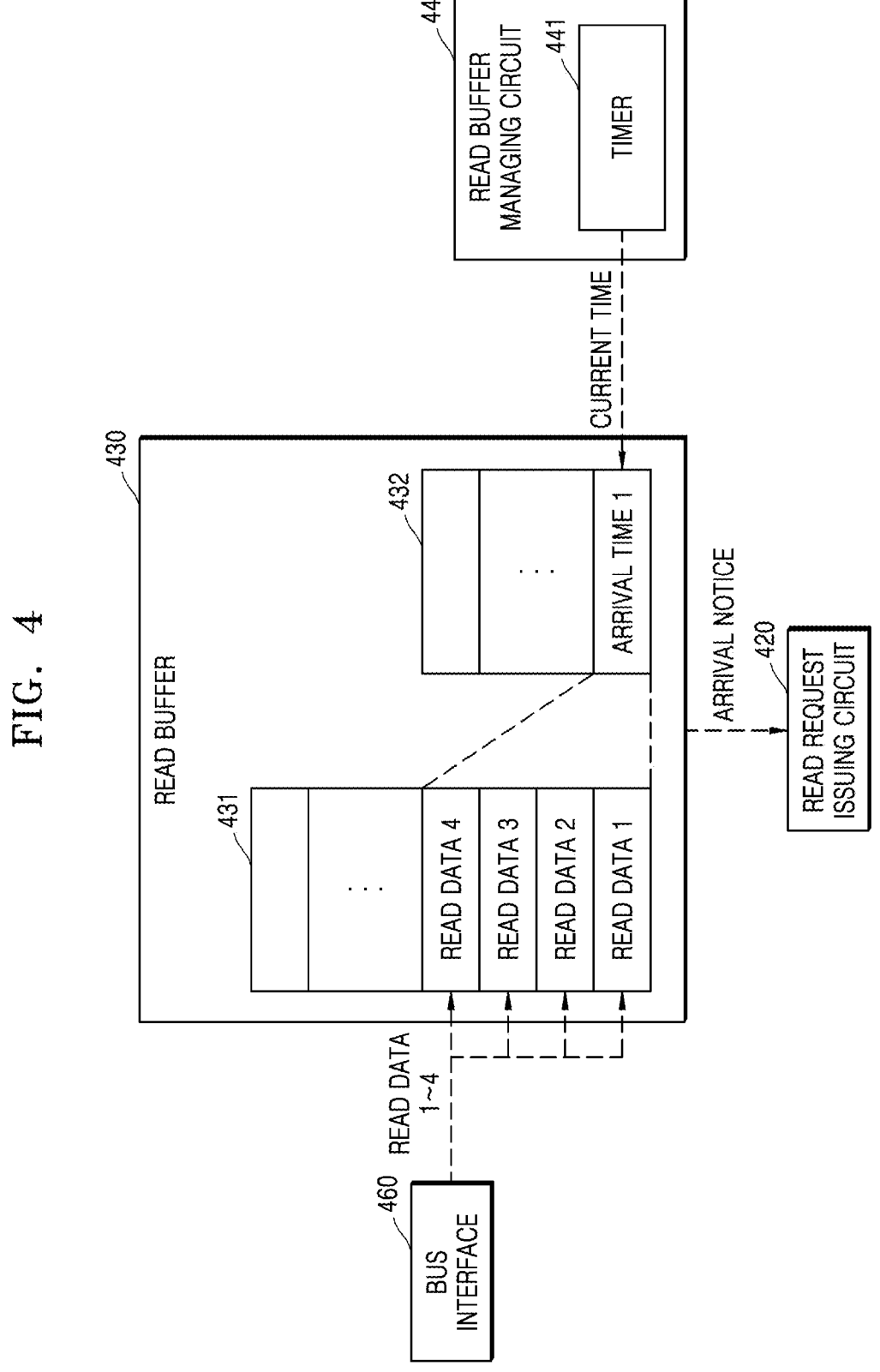
FIG. 4 is a diagram illustrating an operation according to read data reception of a DMA device, according to an embodiment.

FIG. 4 is a diagram illustrating an operation according to reception of read data of a DMA device, according to an embodiment.

FIG. 4 illustrates the read request issuing circuit 420, the read buffer 430, the read buffer managing circuit 440, and the bus interface 460 included in the DMA device 400 according to an embodiment.

The read buffer 430 may include the read data buffer 431 and the arrival time table 432. The read data buffer 431 may temporarily store the received read data and may store first to fourth read data in an embodiment according to FIG. 4. The arrival time table 432 may store an arrival time corresponding to the read data stored in the read data buffer 431 and may store the first arrival time in an embodiment according to FIG. 4. In this case, the first arrival time may correspond to the first to fourth read data. In this case, the first to fourth read data may be the read data received according to the same read request.

In an embodiment according to FIG. 4, as the read buffer 430 receives the first to fourth read data from the bus interface 460, the read data buffer 431 may store the first to fourth read data. In this case, as the read buffer 430 receives the first to fourth read data, the arrival time table 432 may receive the current time from the read buffer managing circuit 440 and store the received current time as the first arrival time. Also, as the read buffer 430 receives the first to fourth read data, the read buffer 430 may transmit an arrival notice of the read data to the read request issuing circuit 420.

Figure 5:
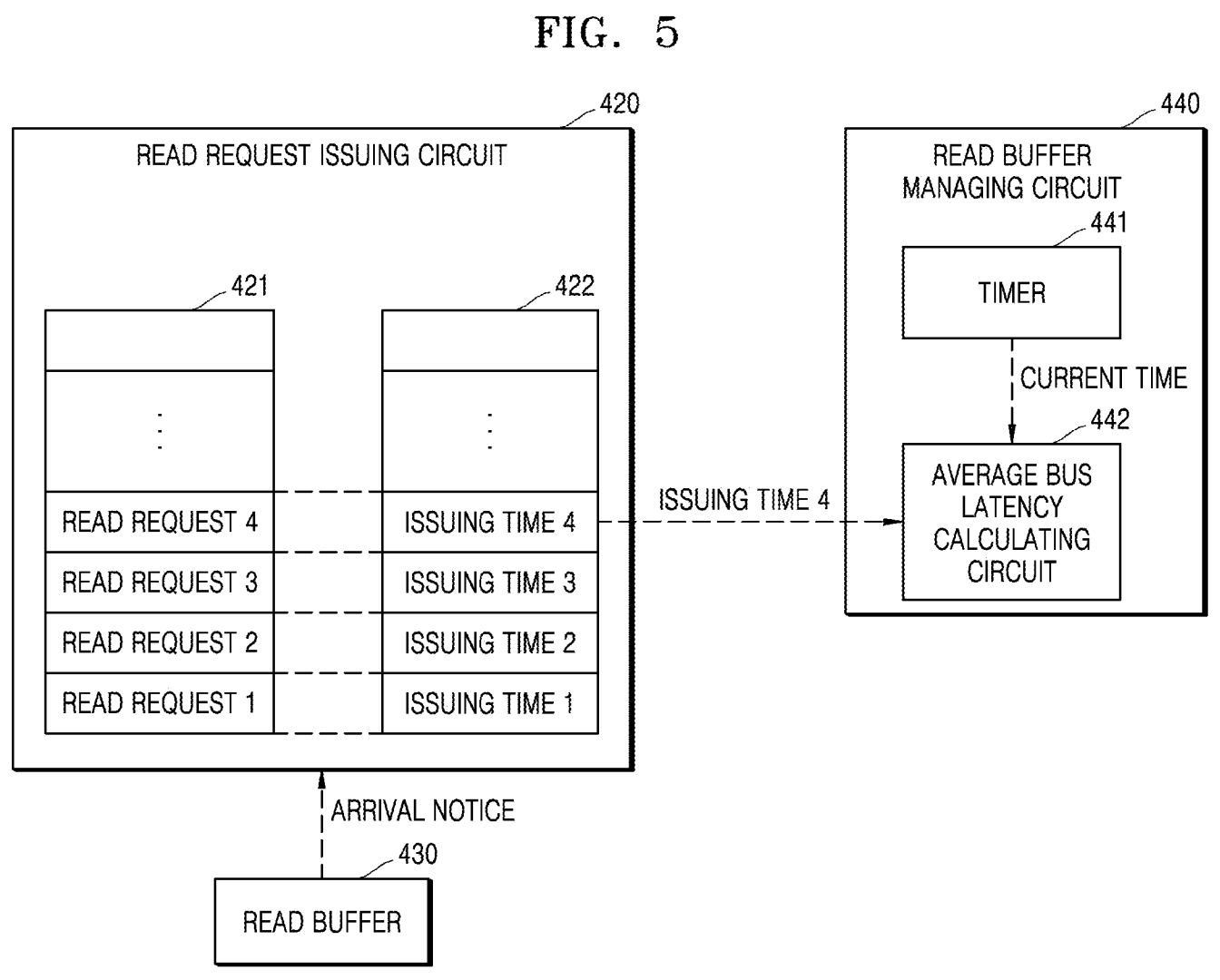

FIG. 5 is a diagram illustrating an operation of calculating an average bus latency by a DMA device, according to an embodiment.

FIG. 5 illustrates the read request issuing circuit 420, the read buffer managing circuit 440, and the bus interface 460 included in the DMA device 400, according to an embodiment. In this case, the request table 421 and the issuing time table 422 included in the read request issuing circuit 420 may be in the same state as shown in FIG. 3.

When receiving an arrival notice of read data, the read request issuing circuit 420 may output the fourth issuing time stored in the issuing time table 422 to the average bus latency calculating circuit 442 of the read buffer managing circuit 440.

When receiving the fourth issuing time from the read request issuing circuit 420, the average bus latency calculating circuit 442 may receive the current time from the timer 441. Next, the average bus latency calculating circuit 442 may calculate a difference between the fourth issuing time and the current time as a bus latency. The average bus latency calculating circuit 442 may calculate an average bus latency by obtaining a movement average between the calculated bus latency and the previously calculated average bus latency.

Figure 6:
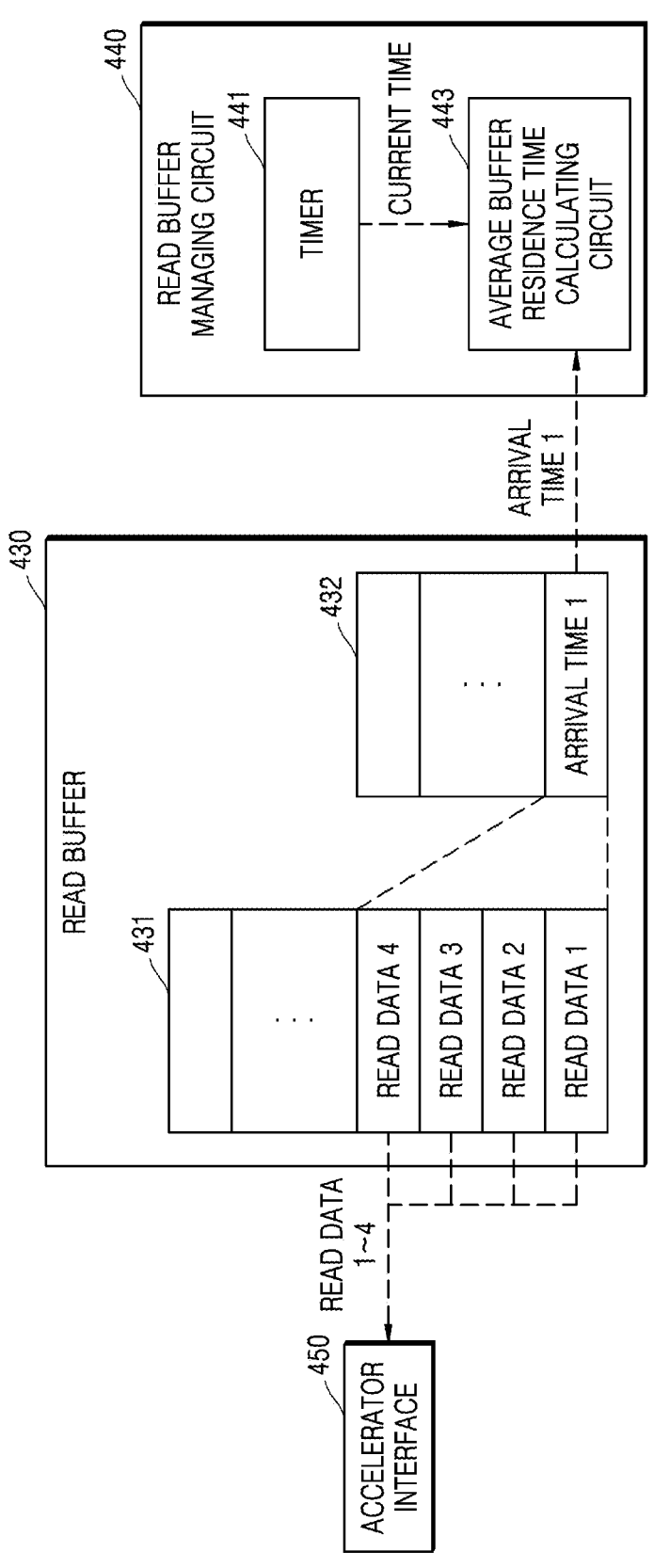
FIG. 6 is a diagram illustrating an operation of calculating an average buffer residence time by a DMA device, according to an embodiment.

FIG. 6 is a diagram illustrating an operation of calculating an average buffer residence time by a DMA device, according to an embodiment.

FIG. 6 illustrates the read buffer 430, the read buffer managing circuit 440, and the accelerator interface 450 included in the DMA device 400 according to an embodiment. In this case, the read data buffer 431 and the arrival time table 432 included in the read buffer 430 may be in the same state as shown in FIG. 4.

The read buffer 430 may output the temporarily stored first to fourth read data to the accelerator 300 through the accelerator interface 450 according to a request of the accelerator 300. After the first to fourth read data are output to the accelerator interface 450, the read buffer 430 may output the first arrival time stored in the arrival time table 432 to the average buffer residence time calculating circuit 443 of the read buffer managing circuit 440.

When receiving the first arrival time from the read buffer 430, the average buffer residence time calculating circuit 443 may receive the current time from the timer 441. Next, the average buffer residence time calculating circuit 443 may calculate a difference between the first arrival time and the current time as a buffer residence time. The average buffer residence time calculating circuit 443 may calculate an average buffer residence time by obtaining a movement average between the calculated buffer residence time and the previously calculated average buffer residence time.

Figure 7:
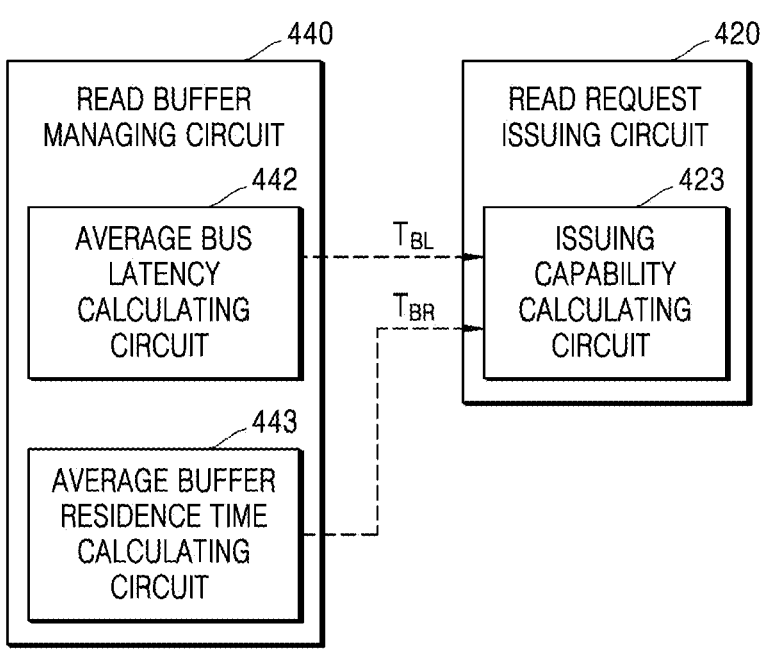
FIG. 7 is a diagram illustrating an operation of adjusting issuing capability by a DMA device, according to an embodiment.

FIG. 7 is a diagram illustrating an operation of adjusting issuing capability by a DMA device, according to an embodiment.

FIG. 7 illustrates the read request issuing circuit 420 and the read buffer managing circuit 440 included in the DMA device 400, according to an embodiment.

The issuing capability calculating circuit 423 of the read request issuing circuit 420 may adjust the issuing capability at each preset adjustment time interval. In this case, in order to adjust the issuing capability, the issuing capability calculating circuit 423 may receive an average bus latency TBL from the average bus latency calculating circuit 442 of the read buffer managing circuit 440 at each adjustment time interval, and receive an average buffer residence time TBR from the average buffer residence time calculating circuit 443 of the read buffer managing circuit 440.

The issuing capability calculating circuit 423 may adjust the issuing capability based on the received average bus latency TBL and the average buffer residence time TBR. For example, the issuing capability calculating circuit 423 may adjust the issuing capability to be proportional to the average bus latency TBL. Also, the issuing capability calculating circuit 423 may adjust the issuing capability to be inversely proportional to the average buffer residence time TBR.

Figure 8:
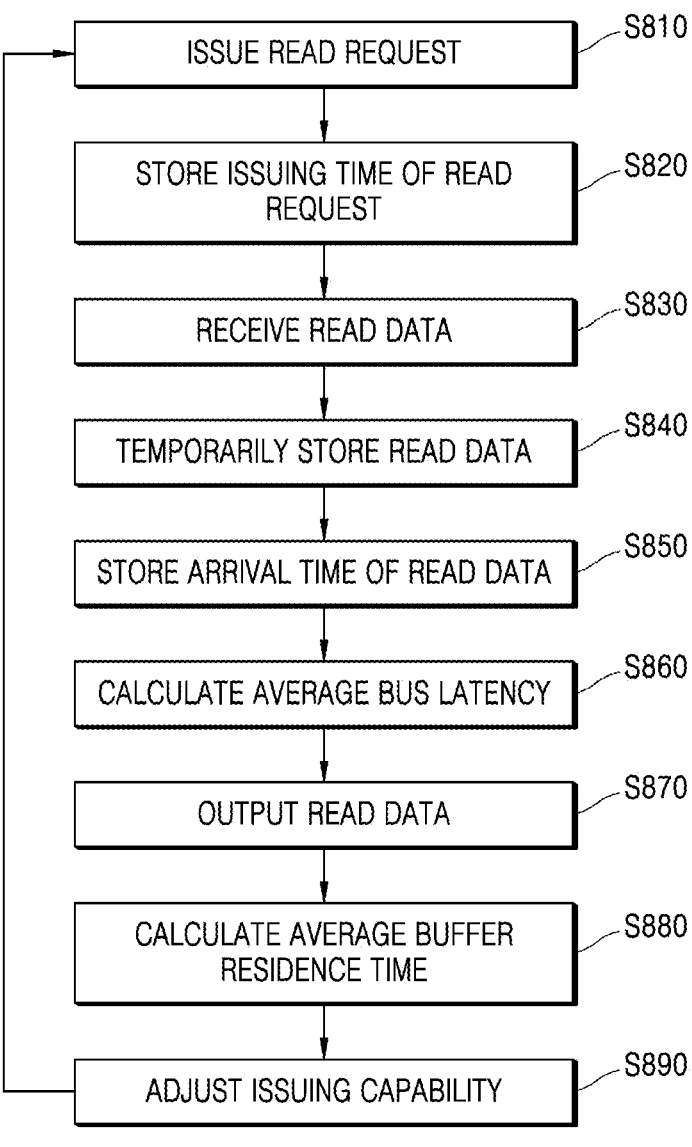
FIG. 8 is a flowchart illustrating an operating method of a DMA device, according to an embodiment.

FIG. 8 is a flowchart illustrating an operating method of a DMA device according to an embodiment.

Referring to FIG. 8, the DMA device 400 may issue a read request in operation S810. The DMA device 400 may issue a read request based on issuing capability through the read request issuing circuit 420. The read request issued by the read request issuing circuit 420 may be transmitted to the memory device 200 through the bus interface 460 and the system bus 500. The read request issuing circuit 420 may store the issued read request in the request table 421.

In operation S820, the DMA device 400 may store an issuing time of the read request. For example, the DMA device 400 may store an issuing time corresponding to the read request issued in operation S810 in the issuing time table 422 of the read request issuing circuit 420. In this case, the issuing time table 422 may store the current time received from the timer 441 of the read buffer managing circuit 440 as the issuing time of the read request.

In operation S830, the DMA device 400 may receive read data. For example, the read buffer 430 of the DMA device 400 may receive read data corresponding to the read request issued in operation S810 through the bus interface 460. In this case, the number of pieces of read data may be plural. By receiving the read data, the read buffer 430 may transmit an arrival notice of the read data to the read request issuing circuit 420.

In operation S840, the DMA device 400 may temporarily store the read data. For example, the DMA device 400 may temporarily store the read data received in operation S830 in the read data buffer 431 of the read buffer 430. In this case, the read data buffer 431 may store the read data until the read data is output to the accelerator 300.

In operation S850, the DMA device 400 may store an arrival time of the read data. For example, the DMA device 400 may store the arrival time corresponding to the read data received in operation S830 in the arrival time table 432 of the read buffer 430. In this case, the arrival time table 432 may store the current time received from the timer 441 of the read buffer managing circuit 440 as the arrival time of the read data.

In operation S860, the DMA device 400 may calculate an average bus latency. For example, the DMA device 400 may calculate the average bus latency based on an issuing time of the read request and current time through the average bus latency calculating circuit 442. By receiving an arrival notice of the read data, the average bus latency calculating circuit 442 may receive the issuing time of the read request from the issuing time table 422 of the read request issuing circuit 420. Also, the average bus latency calculating circuit 442 may receive the current time from the timer 441 of the read buffer managing circuit 440. Next, the average bus latency calculating circuit 442 may calculate an average bus latency based on a difference between the issuing time of the received read request and the current time.

In operation S870, the DMA device 400 may output the read data. For example, the read data buffer 431 of the DMA device 400 may output the received read data to the accelerator 300 through the accelerator interface 450 according to a request from the accelerator 300.

In operation S880, the DMA device 400 may calculate an average buffer residence time. For example, the DMA device 400 may calculate the average buffer residence time based on the arrival time of read data and the current time through the average buffer residence time calculating circuit 443. As the read data is output to the accelerator 300, the average buffer residence time calculating circuit 443 may receive the arrival time of the read data from the arrival time table 432 of the read buffer 430. Also, the average buffer residence time calculating circuit 443 may receive the current time from the timer 441 of the read buffer managing circuit 440. Next, the average buffer residence time calculating circuit 443 may calculate the average buffer residence time based on the difference between the arrival time of the received read data and the current time.

In operation S890, the DMA device 400 may adjust issuing capability. For example, the DMA device 400 may adjust the issuing capability based on the average bus latency and the average buffer residence time through the issuing capability calculating circuit 423. In this case, the issuing capability calculating circuit 423 may adjust the issuing capability to be proportional to the average bus latency and may adjust the issuing capability to be inversely proportional to the average buffer residence time.

After the issuing capability is adjusted in operation S890, the processing proceeds to operation S810, and the DMA device 400 may issue a read request based on the adjusted issuing capability.

By using the operating method of the DMA device 400 according to embodiments of the inventive concept described above, the issuing capability may be adjusted based on an average bus latency and an average buffer residence time, and by issuing a read request based on the adjusted issuing capability, the DMA device 400 may provide improved performance depending on the throughput of the accelerator 300 and a state of the system bus 500.

Figure 9:
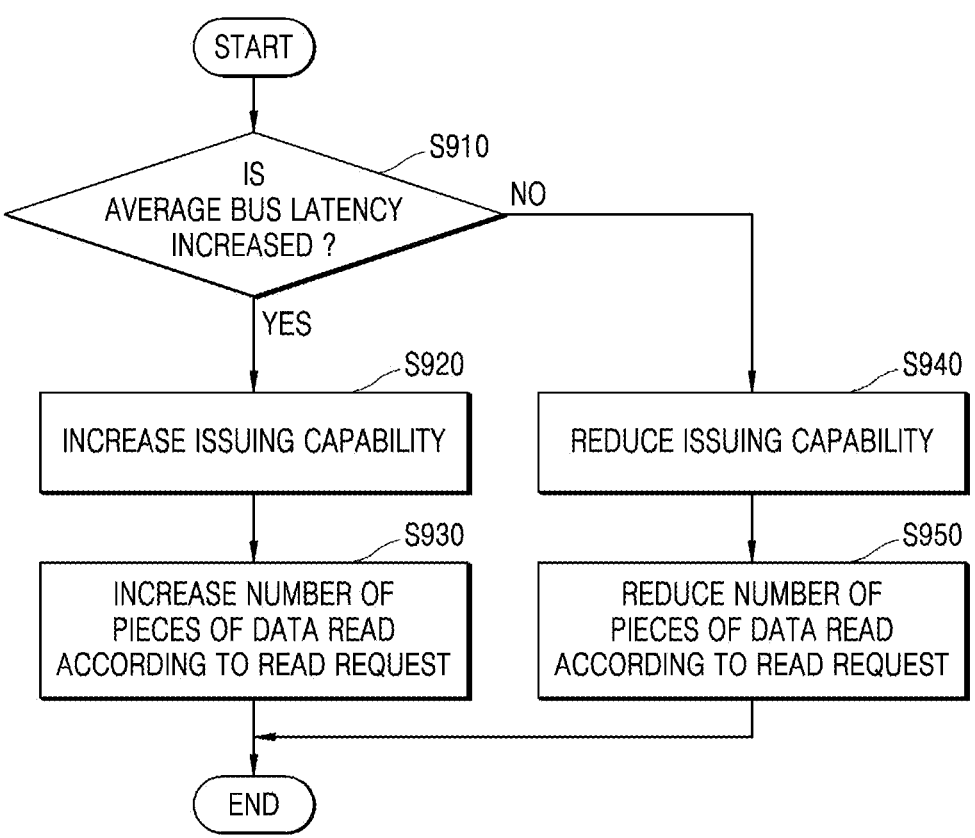
FIG. 9 is a flowchart illustrating a method of adjusting issuing capability based on an average bus latency by a DMA device, according to an embodiment.

FIG. 9 is a flowchart illustrating a method of adjusting issuing capability based on an average bus latency by a DMA device, according to an embodiment.

Referring to FIG. 9, in operation S910, the DMA device 400 may determine whether an average bus latency is increased. The DMA device 400 may determine whether the average bus latency is increased from a previously calculated value through the read request issuing circuit 420.

When it is determined that the average bus latency is increased, the processing proceeds to operation S920, and the DMA device 400 may increase the issuing capability. When the average bus latency is increased, the DMA device 400 may increase the issuing capability through the issuing capability calculating circuit 423 to read the data utilized by the accelerator 300 from the memory device 200 in advance.

Next, in operation S930, the DMA device 400 may increase the number of pieces of data that is read according to a read request. That is, by increasing the issuing capability, the DMA device 400 may increase the number of pieces of data that is read according to the read request when the read request is subsequently issued.

When it is determined that the average bus latency is decreased, the processing proceeds to operation S940, and the DMA device 400 may reduce the issuing capability. When the average bus latency is decreased, the data requested by the accelerator 300 does not need to be read in advance from the memory device 200, and accordingly, the DMA device 400 may reduce the issuing capability through the issuing capability calculating circuit 423.

Next, in operation S950, the DMA device 400 may reduce the number of pieces of data that is read according to a read request. That is, by reducing the issuing capability, the DMA device 400 may reduce the number of pieces of data that is read according to the read request when the read request is subsequently issued.

Figure 10:
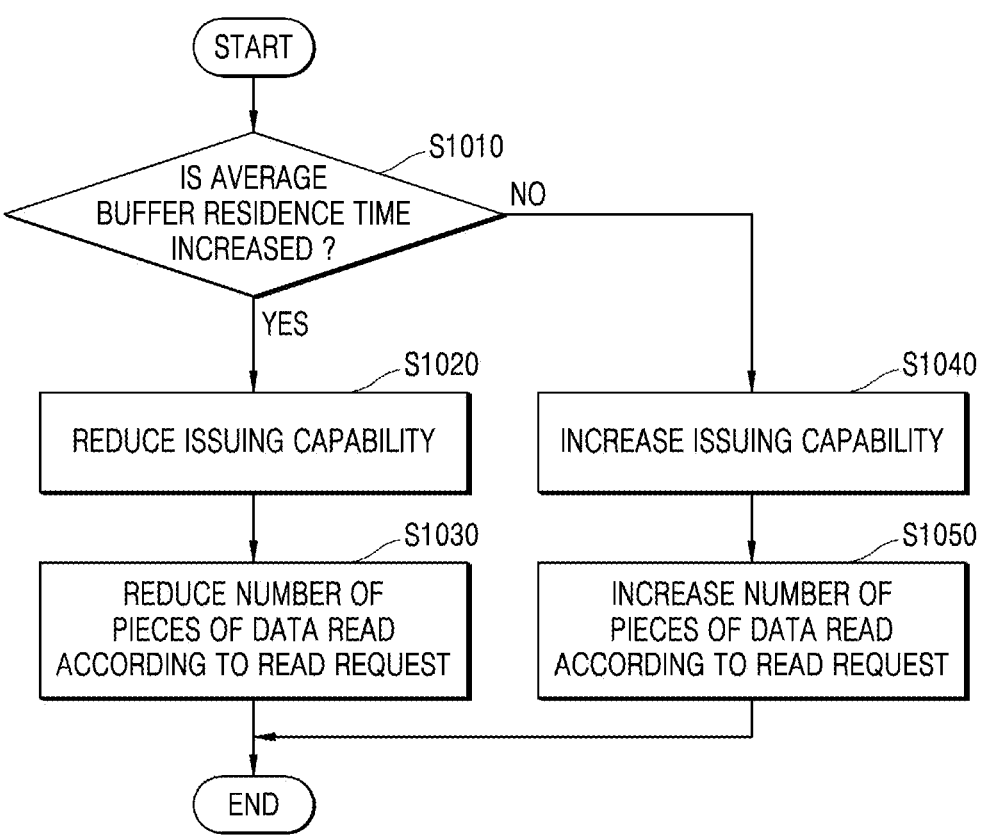
FIG. 10 is a flowchart illustrating a method of adjusting issuing capability based on an average buffer residence time by a DMA device, according to an embodiment.

FIG. 10 is a flowchart illustrating a method of adjusting issuing capability based on an average buffer residence time by a DMA device, according to an embodiment.

Referring to FIG. 10, in operation S1010, the DMA device 400 may determine whether an average buffer residence time is increased. The DMA device 400 may determine whether the average buffer residence time is increased from a previously calculated value through the read request issuing circuit 420.

When it is determined that the average buffer residence time is increased, the processing proceeds to operation S1020, and the DMA device 400 may reduce the issuing capability. When the average buffer residence time is increased, data processing of the accelerator 300 is delayed, and accordingly, the DMA device 400 may reduce the issuing capability through the issuing capability calculating circuit 423.

Next, in operation S1030, the DMA device 400 may reduce the number of pieces of data that is read according to a read request. Operations S1020 and S1030 may be respectively the same as operations S940 and S950 of FIG. 9.

When it is determined that the average buffer residence time is decreased, the processing proceeds to operation S1040, and the DMA device 400 may increase the issuing capability. When the average buffer residence time is decreased, data processing of the accelerator 300 is performed quickly, and accordingly, the DMA device 400 may increase the issuing capability through the issuing capability calculating circuit 423.

Next, in operation S1050, the DMA device 400 may increase the number of pieces of data that is read according to a read request. Operations S1040 and S1050 may be respectively the same as operations S920 and S930 of FIG. 9.

As is traditional in the field of the inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the inventive concept has been particularly shown and described with reference to embodiments thereof, it will be understood that various changes in form and details may be made therein without departing from the spirit and scope of the inventive concept as defined by the following claims.

What is claimed is:

1. A direct memory access (DMA) device that reads data utilized for an operation of an accelerator from a memory device, the DMA device comprising:

a controller configured to control an operation of the DMA device;

a read request issuing circuit configured to issue a read request based on an issuing capability and store an issuing time of the read request;

a read buffer configured to temporarily store read data corresponding to the read request and store an arrival time of the read data; and a read buffer managing circuit configured to count a current time, calculate an average bus latency based on the issuing time of the read request when receiving the read data from the memory device, and calculate an average buffer residence time based on the arrival time of the read data when the read data stored in the read buffer is output to the accelerator, wherein the read request issuing circuit is configured to adjust the issuing capability based on the average bus latency and the average buffer residence time and issue the read request based on the adjusted issuing capability.

2. The DMA device of claim 1, wherein the controller is configured to set an initial value of the issuing capability based on a size of the read buffer.

3. The DMA device of claim 1, wherein the read request issuing circuit comprises:

a request table configured to store the issued read request; and an issuing time table configured to receive the current time from the read buffer managing circuit when the read request is issued, and store the received current time as the issuing time of the read request.

4. The DMA device of claim 1, wherein the read buffer comprises:

a read data buffer configured to temporarily store the read data; and an arrival time table configured to receive the current time from the read buffer managing circuit when receiving the read data, and store the received current time as the arrival time of the read data.

5. The DMA device of claim 4, wherein the arrival time corresponds to a plurality of pieces of read data received according to a same read request.

6. The DMA device of claim 1, wherein, when receiving the read data from the memory device, the read buffer is configured to transmit an arrival notice of the read data to the read request issuing circuit, and when receiving the arrival notice of the read data, the read request issuing circuit is configured to output the issuing time of the read request corresponding to the read data to the read buffer managing circuit.

7. The DMA device of claim 6, wherein, when receiving the issuing time of the read request, the read buffer managing circuit is configured to calculate the average bus latency based on a difference between the issuing time of the read request and the current time.

8. The DMA device of claim 1, wherein, when the temporarily stored read data is output to the accelerator, the read buffer is configured to output the arrival time of the read data corresponding to the read data to the read buffer managing circuit.

9. The DMA device of claim 8, wherein, when receiving the arrival time of the read data, the read buffer managing circuit is configured to calculate the average buffer residence time based on a difference between the arrival time of the read data and the current time.

10. The DMA device of claim 1, wherein the read request issuing circuit is configured to adjust the issuing capability based on the average bus latency and the average buffer residence time at each of a plurality of preset adjustment time intervals.

11. The DMA device of claim 1, wherein the read request issuing circuit is configured to adjust the issuing capability in proportion to the average bus latency and adjust the issuing capability in inverse proportion to the average buffer residence time.

12. The DMA device of claim 11, wherein the read request issuing circuit is configured to adjust a number of pieces of data that is read from the memory device according to the read request in proportion to the issuing capability.

13. An operating method of a direct memory access (DMA) device that reads data utilized for an operation of an accelerator from a memory device, the operating method comprising:

issuing, by a read request issuing circuit, a read request based on an issuing capability;

storing an issuing time of the read request in the read request issuing circuit;

receiving, by a read buffer, read data corresponding to the read request;

temporarily storing the read data corresponding to the read request in a read buffer;

storing an arrival time of the read data in the read buffer;

calculating, by a read buffer managing circuit, an average bus latency based on the issuing time of the read request;

calculating, by the read buffer managing circuit, an average buffer residence time based on the arrival time of the read data when the read data stored in the read buffer is output to the accelerator;

adjusting, by the read request issuing circuit, the issuing capability based on the average bus latency and the average buffer residence time; and issuing, by the read request issuing circuit, the read request based on the adjusted issuing capability.

14. The operating method of claim 13, further comprising:

transmitting, by the read buffer, an arrival notice of the read data to the read request issuing circuit after receiving the read data; and outputting, by the read request issuing circuit, the issuing time of the read request corresponding to the read data to the read buffer managing circuit when receiving the arrival notice of the read data.

15. The operating method of claim 14, wherein calculating the average bus latency comprises calculating the average bus latency based on a difference between the issuing time of the read request and a current time when receiving the issuing time of the read request.

16. The operating method of claim 13, further comprising:

outputting, by the read buffer, the arrival time of the read data corresponding to the read request to the read buffer managing circuit when the temporarily stored read data is output to the accelerator.

17. The operating method of claim 16, wherein calculating the average buffer residence time comprises calculating the average buffer residence time based on a difference between the arrival time of the read data and a current time when receiving the arrival time of the read data.

18. The operating method of claim 13, wherein adjusting the issuing capability comprises:

adjusting the issuing capability in proportion to the average bus latency; and adjusting the issuing capability in inverse proportion to the average buffer residence time.

19. The operating method of claim 18, wherein issuing the read request comprises issuing the read request by adjusting a number of pieces of data that is read from the memory device according to the read request, in proportion to the issuing capability.

20. An electronic device, comprising:

a memory device configured to store data;

an accelerator configured to operate based on the data stored in the memory device; and a direct memory access (DMA) device configured to read data utilized for an operation of the accelerator from the memory device, wherein the DMA device comprises:

a controller configured to control an operation of the DMA device;

a read request issuing circuit configured to issue a read request based on an issuing capability and store an issuing time of the read request;

a read buffer configured to temporarily store read data corresponding to the read request and store an arrival time of the read data; and a read buffer managing circuit configured to count a current time, calculate an average bus latency based on the issuing time of the read request when receiving the read data from the memory device, and calculate an average buffer residence time based on the arrival time of the read data when the read data stored in the read buffer is output to the accelerator, wherein the read request issuing circuit is configured to adjust the issuing capability based on the average bus latency and the average buffer residence time and issues the read request based on the adjusted issuing capability.

\* \* \* \* \*